Aug. 13, 1968  G. J. JENNRICH ET AL  3,396,952
APPARATUS AND PROCESS FOR PRODUCING CALCINED PHOSPHATE FLAKES
Filed March 10, 1967  2 Sheets-Sheet 1

Inventors
George J. Jennrich
William A. Blann
By Arthur M. Streich
Attorney

Aug. 13, 1968  G. J. JENNRICH ET AL  3,396,952
APPARATUS AND PROCESS FOR PRODUCING CALCINED PHOSPHATE FLAKES
Filed March 10, 1967  2 Sheets-Sheet 2

Inventors
George J. Jennrich
William A. Blann
By Arthur M. Streich
Attorney

United States Patent Office 3,396,952
Patented Aug. 13, 1968

3,396,952
APPARATUS AND PROCESS FOR PRODUCING CALCINED PHOSPHATE FLAKES
George J. Jennrich, Milwaukee, and William A. Blann, New Berlin, Wis., assignors to Allis-Chalmers Manufacturing Company, Milwaukee, Wis.
Filed Mar. 10, 1967, Ser. No. 622,254
14 Claims. (Cl. 263—32)

ABSTRACT OF THE DISCLOSURE

A system for making calcined flakes from a material containing a mineral, such as phosphate and some carbonaceous material, in which the material is prepared to have a particular free moisture content, is then pressed in a sheet by pressure controlled to provide in the sheet a particular internal voids to solids ratio, the sheet is broken into flakes of a particular size relative to flake thickness, the flakes are dried by heating to a temperature below calcining temperature at least until moisture in the flakes is vaporized and driven from the flakes, and the dried flakes are then heated above calcining temperature at least until the carbonaceous material is oxidized to carbon dioxide gas and driven from the flake.

BACKGROUND OF THE INVENTION

Field of the invention

The present invention relates to a mineral processing apparatus involving agglomerating and furnacing operations and in particular to an apparatus and process for making hard burned flakes from particles of phosphate ore and the like.

Description of the prior art

For many years nodulizing kilns have been known as an apparatus for producing hard burned agglomerates of mineral ore. Nodulizing kilns have been operated with a feed that is minus ¼ inch. When such a feed material is fed to a nodulizing kiln and calcined (to burn off carbonaceous material as a carbon dioxide gas) at temperatures over 2400° F., small particles of the material fuse to form nodules of various sizes, which is a disadvantage to operators who whould like to have a uniform size product. A further disadvantage of heating such material to calcining temperature is the substantial amount of a ring-like deposit of small particles that fuses to and builds up on the internal lining of the kiln to a thickness that must be removed from time to time. A nodulizing kiln is also relatively inefficient in the utilization of fuel. Although material heated in the kiln is heated quite uniformly, the temperature of kiln exit gas is quite high and much heat is wasted. In order to achieve greater fuel economy and reduce the amount of fines in a kiln, an apparatus was developed having a traveling grate preheater ahead of a calcining kiln, utilizing exit gas from the kiln to preheat the material. Such an apparatus is disclosed for use with finely ground material rolled into balls in U.S. Patent to Lellep 2,466,601 for use with a slurry dewatered to form filter cakes in U.S. Patent to Lellep 2,580,235. The apparatus of U.S. Patent 2,466,601 in particular has been widely used throughout the world to produce Portland cement. At a later date a process for producing hard burned pellets of iron ore was developed (U.S. patent to Stowasser 2,925,336) that has been commercially performed using an apparatus of the type disclosed in the Lellep patent U.S. 2,466,601. An apparatus such as is disclosed in the Lellep patent U.S. 2,466,601 however requires that the raw material made into balls be of rather small particle size, usually minus 100 mesh or smaller. This requirment is no significant disadvantage in cement and some iron ore operations because there are other requirements prior to the balling operations that require the feed material to be ground to small particle size. Cement making operations require the raw material to be finely ground in order to properly blend the limestone and clap constituents of cement raw material and when the apparatus has been used for iron ore it has utilized a feed that is composed of natural fines or ore ground to fines in order to be concentrated prior to balling. The apparatus of the second mentioned Lellep patent U.S. 2,580,235 also requires finely ground material, which for that apparatus is mixed with water and then passed over a filter drum to form a wet filter cake.

There are, however, a number of materials which are burned to calcining temperature, including such as phosphate ore, and for which there is no process requirement prior to furnacing that requires fine grinding. Thus for such materials the requirement for fine grinding associated with apparatus such as disclosed in the Lellep patents, involves a cost that tends to cancel out much of the economic advantage of the greater thermal efficiencies of such systems.

Summary of the invention

Accordingly, it is a primary object of the present invention to provide an apparatus that will achieve desired thermal efficiency without requiring that feed material be finely ground before furnacing.

Another object of the present invention is to provide a new and improved apparatus and process for calcining mineral ore that first forms particles into flake-like compacts of a controlled size larger than ¼ inch and heats the compacts with hot gases below calcining temperature to drive off free moisture and any chemically combined water in the compacts, prior to calcining.

Another object of the present invention is to provide a new and improved process for calcining phosphate and an improved apparatus including a device for compacting mineral ore into a sheet with pressure controlled to provide the sheet with a predetermined solids to void ratio, a device for breaking the sheet into flakes of approximately predetermined size, a preheating furnace for heating a body of quiescent flakes with gases below calcining temperatures, a calcining furnace for burning preheated flakes, and a cooler for cooling calcined flakes with gas and supplying preheated gas to the calcining furnace.

According to a preferred embodiment of the present invention particles of mineral ore are passed into a nip defined between a pair of impervious rolls arranged in axially parallel alignment. One of the rolls may be journaled in bearings supported in a fixed position and the other roll journaled in bearings movable toward and away from the fixed bearings. The movable bearings are biased by adjustable pressure to maintain the roll journaled therein in a predetermined spaced relation from the roll supported by fixed bearings, to press the material passing between the rolls into a sheet. A breaking device is arranged to engage the sheet and break the sheet into flakes having edges exposing the compacted particles and intersituated voids. The flakes are desirably screened to remove fines and flakes smaller than a predetermined size, which may be recirculated back to the nip between the compacting rolls. Flakes of the predetermined size are deposited upon a traveling grate and transported through a preheating furnace which may be divided into zones for heating the flakes in stages with gases at below calcining temperatures until free moisture and any chemically combined water in the flakes is driven from the flakes.

The edges formed by breaking a sheet into flakes, which exposes internal voids to preheating atmosphere, are particularly advantageous to promote the rapid egress of water vapor from the flakes without building up internal vapor pressures within the flakes that might otherwise cause the flakes to explode and form undesirable small fragments and fines detrimental to efficient operation of the apparatus.

The preheated flakes are discharged from the preheating furnace into a rotary kiln and tumbled through the kiln countercurrent to heated gases which heat the flakes to calcining temperature. The calcined flakes are then discharged into a cooler. A cooling gas, such as air, is passed through the flakes in the cooler. Gas which is heated in the cooler is directed into the calcining kiln and gases discharged from the calcining kiln are passed through the preheating furnace before being discharged to a stack.

Other objects, advantages and the manner in which such are attained will be apparent from the following description of the invention with reference to the drawings.

*Brief description of the drawings*

FIG. 3 is an enlarged view of a flake produced by the apparatus of FIGS. 1 and 2.

*Description of preferred embodiment*

Figure 1:
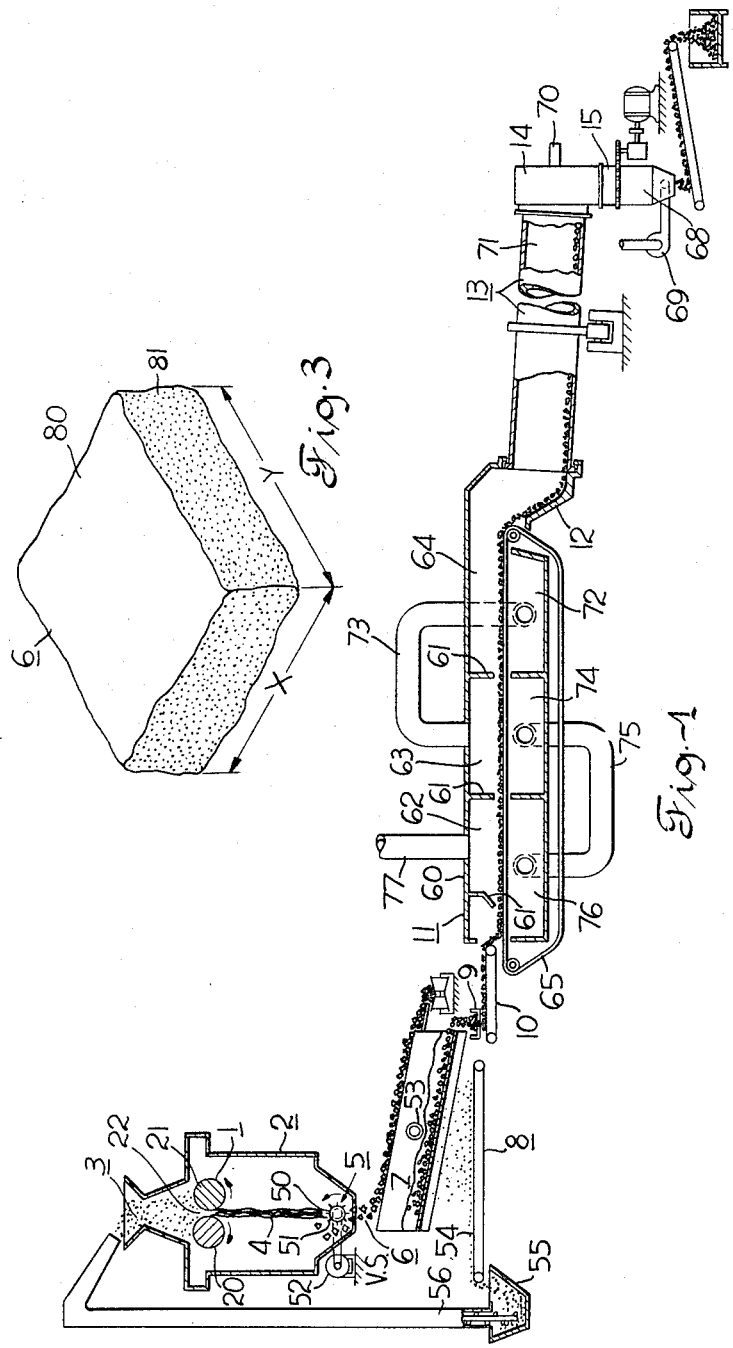
FIG. 1 is a diagram of an apparatus for making hard burned agglomerates of mineral ore according to the present invention.

Referring to FIG. 1 a compacting device 1 is shown arranged within a top portion of a housing 2 for forming particles of material 3 into a sheet 4. A breaking device 5 is arranged within a bottom portion of housing 2 to engage the sheet 4 and break sheet 4 into flakes 6 (see also FIG. 3 which shows an enlarged view of a flake). The flakes 6 are passed over a vibrating screen 7 to separate fines, oversize and undersize flakes from the flakes 6. A conveying system 8 is arranged to collect the fines and undersize flakes for return to the compacting device 1. The flakes 6 passing over screen 7 may be discharged to a spreader 9 which may be of a type disclosed in U.S. Patent 3,184,037, for depositing the flakes to a uniform depth across the entire width of a feed conveyor 10 for delivery to a preheater 11. The preheater 11 is connected by an enclosed and downwardly inclined chute 12 to a rotary kiln 13. A firing hood 14 connects the discharge end of kiln 13.

Figure 2:
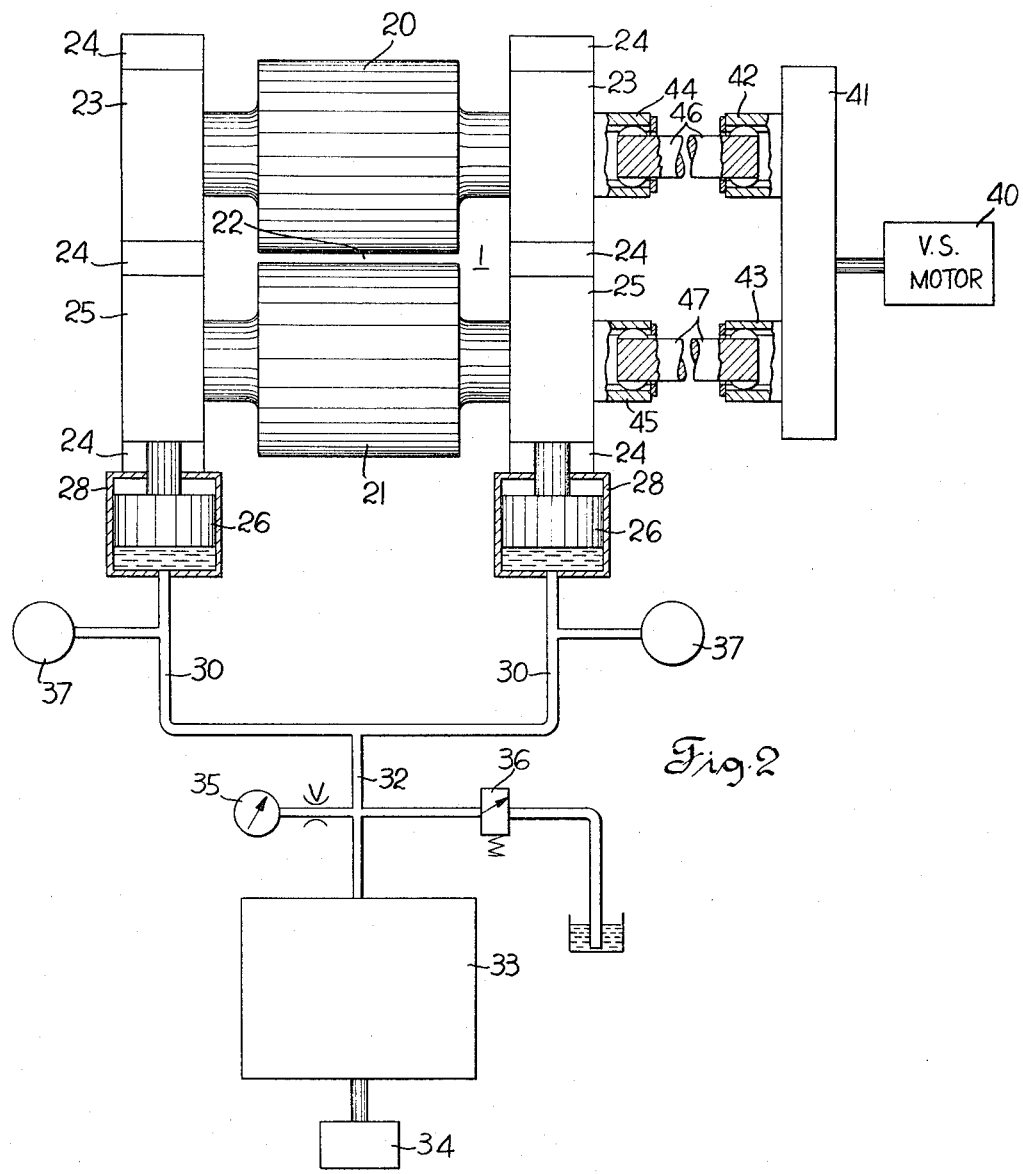
FIG. 2 is a more detailed diagram of the sheet forming device shown in FIG. 1.

Referring to FIG. 2, the compacting device 1 includes a pair of rolls 20, 21 each having an impervious outer cylindrical surface arranged to be in axially parallel alignment and define a nip 22 between the rolls. Roll 20 is journaled in bearings 23 mounted in fixed position on supporting structure 24. Roll 21 is journaled in bearings 25 that are supported on the structure 24 for movement toward and away from roll 20. Roll 21 is biased toward roll 20 by a pair of fluid pressure operated pistons 26 engaging the movable bearings 25. Each of the pistons 26 is mounted in a cylinder 28 mounted on the support structure 24. A branch conduit 30 is connected to each cylinder 28 and a conduit 32, which is in turn connected to a pump 33 driven by a motor 34. A pressure gauge 35 and a pressure relief valve 36 are both connected to the conduit 32. An accumulator 37 is connected to each of the branch conduits 30.

Rolls 20, 21 are driven to rotate as indicated by arrows in FIG. 1. As shown in FIG. 2, rolls 20, 21 may be rotated by a single motor 40 connected to a speed reducer 41 having two output shafts 42, 43. Each of the rolls 20, 21 is provided with a shaft extension piece 44, 45. Output shaft 42 is connected to piece 44 by a floating shaft 46 and output shaft 43 is connected to piece 45 by a floating shaft 47. The floating shafts 46, 47 transmit torque to rolls 20, 21 despite any axial misalignment between the speed reducer 41 and the rolls 20, 21 and permits roll 21 to be moved toward and away from roll 20 to adjust the nip 22.

Referring again to FIG. 1, the breaking device 5 is shown as being a drum or cylinder 50 having radially projecting helical or spiral members 51 for engaging sheet 4. The drum 50 may be turned by such as a variable speed motor 52 and the members 51 engage and break sheet 4 into flakes 6.

The vibrating screen 7 may be of conventional design (preferably having two decks, the top deck diverting oversize and the lower deck discharging to spreader 9) and flexibly supported from above or below by means not shown and having a motor driven vibrator 53 mounted transversely within screen 7 to cause the flakes to bounce and turn as they move down the incline of screen 7 toward the spreader 9. The conveying system 8 includes a conveyer 54 arranged beneath screen 7 to convey fines and undersize flakes to a bin 55. Material in bin 55 may be picked up by a bucket elevator 56 for return to the compacting device 1.

The preheater 11 includes structures that define three separate treating zones. Hood structure 60 and internal baffling 61 define three zones 62, 63 and 64. Zone 62 is a drying zone for driving chemically free water from the flakes, zone 63 is a final drying zone for driving any chemically combined water from the flakes, and zone 64 is a preburning zone for heating the dry flakes with kiln exit gases (over about 1600° F. but below calcining temperature) to transfer heat from the kiln exit gases to the dry flakes and lower the temperature of the gases sufficiently so the gases can be used to dry flakes at a rate that will not cause the pressure of water vapor in the flakes to rupture the flakes. The preheater shown and described as defining three such zones is particularly well adapted to handle flakes containing a substantial amount of free moisture (i.e., more than about 10%) or a lower free water content combined with a significant amount of chemically combined water (i.e., more than about 1%).

In some installations two zones preceding the preburning zone may not be required. To describe apparatus capable of operation under the most adverse conditions, the preheater 11 is described as including the three zones.

Flakes 6 from the conveyer 10 are carried through the three zones within the hood 60 by a gas permeable conveyer 65. These flakes move as a body through zones 62, 63 and 64 with individual flakes being, relatively speaking, at rest within this moving body. From the conveyer 65, the pellets are discharged down chute 12 and into the rotary kiln 13. Flakes are discharged from the kiln 13 into cooler 15. There are many types of cooling devices that can be used depending on the size of the installation. The cooler 15 shown in FIG. 1 is of relatively simple construction and may be adequate for relatively small operations. Other well-known types of coolers (for example as disclosed in U.S. Patent 3,232,416) will be used for large installations. The cooler shown, by way of example only, comprises a rotating, vertical shaft 68 that contains a downwardly moving column of flakes discharged from kiln 13. A blower 69 blows cooling air upwardly through the descending column of flakes to cool the flakes and preheat the ascending air which is admitted to the firing hood 14 of the kiln 13. Flakes discharged from the lower end of the cooler 15 may be transported away from the installation as desired.

A burner 70, projecting through burner hood 14, provides a flame within the kiln 13. Hot gases proceed through the kiln 13 and the calcining zone 71 defined therein and pass into zone 64 within the hood structure 60. From the zone 64 the hot gases are drawn downwardly through the flakes and the conveyer 65 into a suction box 72 below the grate. From the suction box 72 the hot gases pass through a conduit 73 to zone 63. Here the hot gases make a second pass downwardly through the flakes on the conveyer 65 and are collected in a second suction box 74. The hot gases pass from the second suction box 74 through a conduit 75 that may lead these gases to a wind box 76 beneath zone 62. Here the hot gases pass upwardly through flakes on the traveling grate 65 into zone 62 and they are exhausted through a conduit 77. The flow of gases may be promoted by such as an exhaust fan (not shown) arranged to draw gases out through conduit 77.

In the embodiment shown in FIG. 1 as previously mentioned, it is assumed that the flakes are either quite wet or contain chemically combined water and therefore require two-stage drying. Thus, in an apparatus providing such two-stage drying, the flakes deposited upon the traveling grate 65 will move into and through two drying zones 62, 63. As the flakes pass through the first drying zone 62 warm gases may be passed upwardly rather than downwardly through the flakes for a reason that will now be explained. When two drying zones are provided, as here shown, because of relatively wet flakes, it may be preferred that the gases passing through the flakes in the zone 62 be directed in an upwardly direction rather than in a downflow direction to carry the maximum amount of water away from the flakes in the lower levels of the flakes on the grate and to do so as quickly as possible. If a downflow of gases is used in a first zone for preliminary drying of relatively very wet flakes and even greater concentration of water would result at the bottom of the body of flakes which might weaken the flakes to the extent that they might be squashed or broken. This would not only destroy the shape and composition that so much trouble has been gone to to provide, but also the permeability of the body of flakes on the grate would be destroyed and further gas flow could not find its way through the mass of flakes on the grate. For such reasons, therefore, an upward flow of gases through a first drying zone, when relatively wet flakes are handled, may be preferred.

In zone 63 (which in some installations may be the first zone over conveyer 65) flakes are carried through the zone and drying gases are directed downwardly through the flakes on the traveling grate. Substantially all chemically free and the major portion of the chemically combined water should be driven out of the flakes before the flakes are permitted to leave this zone.

If the flakes are permitted to enter the preburning zone 64 before all chemically free and chemically combined water is driven from the flakes, the sudden exposure of the flakes to the temperature at which gases come from kiln 13, would vaporize the water and build up pressure so rapidly that some flakes would explode. If the flakes were permitted to explode, smaller than desired flakes would be created along with fines and this has at least three disadvantages. First, the fines and small pieces tend to block flow of gases through the material on the grate. Second, the fines would create an objectionable build-up of material fused to the inner surface of kin 13. And third, the system would not produce a finished product having the uniformity of size that operators desire.

The described apparatus is well suited to perform a process to produce flakes of phosphate ore containing some carbonaceous material. The phosphate ore is prepared to provide feed material of particle sizes minus ½ inch and having a free moisture content of from 6 to 15 percent, preferably about 13 percent. This feed may be fed into the nip 22 between rolls 20, 21 and pressure applied to bearings 25 (see FIG. 2) to form a sheet about ½ inch thick and having 20 to 40 percent voids (preferably about 35 percent voids) by applying pressure of about 8,500 pounds per lineal inch of the nip 22. With rolls 20, 21 spaced ½ inch apart the operation can tolerate about 5% to 10% of the feed particles being of maximum size, i.e., ½ inch, and still provide the desired flakes. Drum 50 of the breaking device 5 may be rotated to cause the projecting members 51 to break sheet 4 into flakes 6 as shown in FIG. 3. It is not necessary that flake 6 have any particular configuration but it is preferable that a flake 6 have a surface 80 having a maximum dimension, such as $x$ or $y$, no greater than three times flake thickness. As shown in FIG. 3, the flake so formed has edges 81 exposing the internal porosity of particles and voids, to a greater degree than are exposed in the relatively smooth surface 80 which has made direct contact with one of the rolls 20, 21. For an operation involving flakes ½ inch thick a screen 7 may be used having openings of about ¾ inch so that flakes and fines passing therethrough are collected on conveyer 54 for return to the compacting device 1 and flakes passing over screen 7 are discharged to spreader 9 and conveyer 10. For processing some ores a preliminary zone such as 62 may not be required and the flakes may be fed directly to zone 63 for drying with gases between 600 and 900 degrees Fahrenheit. Dry flakes may then be preburned in zone 64 until the flakes have sufficient strength to withstand tumbling in kiln 13. Then the flakes are transferred to kiln 13 for final furnacing to a temperature of 1800° F. or higher and thereafter cooled in the cooler 15.

Although the present apparatus is particularly well suited for processing phosphate ore according to the described process, the apparatus is not limited to that application.

The construction of the compacting device 1 is not per se the subject of the present invention. Such devices have been used to compact a great variety of materials. It is an important feature of the apparatus according to the present invention, however, that a sheet 4 is formed with a controlled voids to solids ratio and then broken into flakes and screened to provide flakes of controlled size, exposing the edges 81 and the internal porosity of the agglomerate, and the flakes are then formed into a body of quiescent flakes and heated at below calcining temperatures to drive out moisture with improved effectiveness through the porosity exposed in edges 81 and thereby permit faster and more effective drying with less danger of vaporized water building up pressures that cause an agglomerate to fracture or explode.

From the foregoing description of preferred embodiments of apparatus according to the present invention, it will be understood that the present invention is unobvious and possessed of unique advantages.

The embodiments of the invention in which an exclusive property or privilege is claimed are defined as follows:

1. A mineral processing apparatus comprising: support means; a pair of cylindrical rolls each having an impervious outer cylindrical surface; a journal bearing mounted on said support means at each end of each roll, each roll being rotatably journaled in a pair of said bearings arranged to align the rolls in parallel opposing positions defining a nip between said rolls for pressing particles of material into a sheet, the journal bearings for at least one of said rolls being movable on said support means to move the roll journaled therein toward and away from the other of said rolls; pressure actuated biasing means connected to said movable bearings; means for adjusting the pressure actuating the biasing means to form said sheet with a predetermined ratio of intersituated voids to solids; a breaking device arranged to engage the sheet and break it into flakes having edges exposing said intersituated voids to atmosphere; means for drying said flakes; means for heating said flakes to above drying temperature; and said sheet forming rolls, said breaking device, said drying means and said heating means being connected in series flow arrangement.

2. An apparatus according to claim 1 in which said rolls are supported with their central axes in a common horizontal plane, feed means mounted above said rolls to discharge material into said nip, and with said breaking device located beneath said rolls to engage and break the sheet discharged downwardly from said rolls.

3. An apparatus according to claim 1 having a screening device arranged between said breaking device and said drying means, with conveying means for recirculating to said nip material passing through said screening device, and a second conveying means for feeding to said drying means flakes passing over said screening device.

4. An apparatus according to claim 1 in which said drying means is a chamber defined by a housing enclosing a space over a traveling grate and said heating means comprises a generally horizontal rotary kiln.

5. An apparatus according to claim 4 in which said housing over said grate is provided with internal wall structure to define following said drying chamber a pre-burn chamber for heating said dehydrated flakes to a temperature in excess of 500° F. but not more than approximately 1900° F.

6. An apparatus according to claim 5 having a flame generating fuel burner projecting into the flake discharge end of said kiln, a flake cooler arranged at the flake discharge end of said kiln for cooling said flakes with air and preheating said air, and means connecting said kiln to said cooler for transferring said flakes from said kiln to said cooler and said preheated air from said cooler to said kiln.

7. A process for making calcined flakes from particles of phosphate ore and the like and containing carbonaceous material, comprising the steps of: preparing a feed mixture of particles of phosphate or the like having a free moisture content of from 6 to 15%; applying pressure to said mixture to form an agglomerate sheet of said particles with partial contact therebetween to define internal intersituated voids; adjusting the pressure applied to said mixture to form said sheet with said voids amounting to 20 to 40% of said sheet; breaking said sheet into flakes having edges exposing said voids to atmosphere; drying said flakes by heating to a temperature below calcining temperature until moisture in the flakes is vaporized and driven from the flakes through said voids exposed in said edges; and heating the dried flakes with gases of progressively higher temperatures to heat the flakes above calcining temperature until the carbonaceous material is oxidized to a carbon dioxide gas and driven from the flakes.

8. A process according to claim 7 in which the mixture of phosphate particles is prepared having a moisture content of approximately 13%.

9. A process according to claim 7 in which the pressure applied to form a sheet of said particles is adjusted to provide voids in said sheet amounting to approximately 35% of said sheet.

10. A process according to claim 9 in which pressure is applied to said mixture of particles by passing said mixture through a nip defined by a pair of parallel impervious rolls spaced apart ½ inch, pressure is applied to urge one of said rolls toward the other roll and the pressure is adjusted to apply approximately 8,500 pounds force per lineal inch of said nip.

11. A process according to claim 10 in which the flakes of particles collected are screened prior to drying to remove and divert from the drying step flakes that are minus ¾ inch.

12. A process according to claim 10 in which the flakes are screened twice prior to the drying step to collect for the drying step flakes that are minus 1½ inch plus ¾ inch.

13. A process according to claim 7 in which the flakes of particles are screened prior to the drying step to provide for the drying step flakes having a maximum dimension of the parallel side surfaces of the flakes is approximately three times the thickness of the flakes.

14. A process according to claim 7 in which the flakes are formed into and maintained as a quiescent body at least until the flakes are dried, and then the quiescent body is disrupted and the flakes are tumbled while being heated at above calcining temperatures at least until the carbonaceous material is oxidized to carbon dioxide gas and driven from the flakes.

References Cited

UNITED STATES PATENTS

| 2,776,828 | 1/1957 | Marcellus et al. | 263—53 |
| 3,243,172 | 3/1966 | Ritzmann | 263—32 |

JOHN J. CAMBY, *Primary Examiner.*